L. LINDEN.
APPARATUS FOR PURIFYING LIQUIDS.
APPLICATION FILED MAR. 16, 1909.
963,448.
Patented July 5, 1910.
2 SHEETS—SHEET 1.
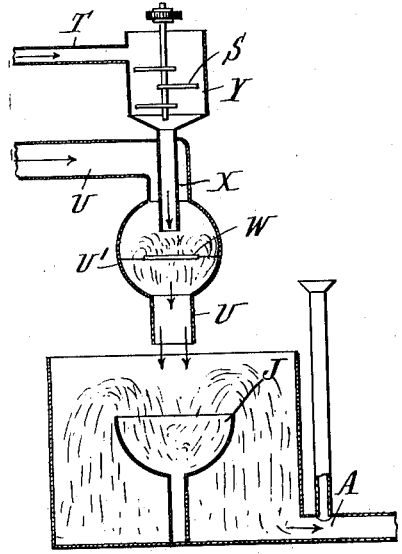
Fig. 1.
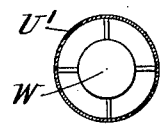
Fig. 2.
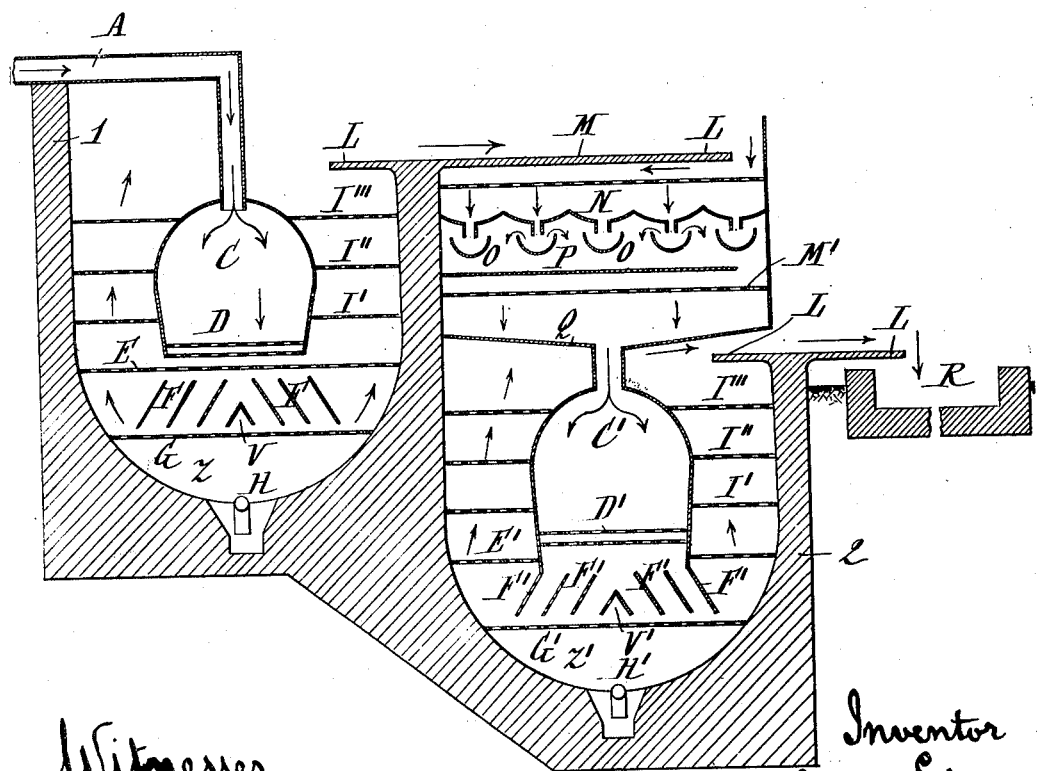
Witnesses
John H. Hoving
Alfred R. Anderson
Inventor
Lucien Linden
by H. Van Idderinkel
Attorney

L. LINDEN.
APPARATUS FOR PURIFYING LIQUIDS.
APPLICATION FILED MAR. 16, 1909.

963,448.

Patented July 5, 1910.

2 SHEETS—SHEET 2.

Witnesses
John H. Hoving
Alfred R. Anderson

Inventor
Lucien Linden
by H. Van Ilsemmel
Attorney

UNITED STATES PATENT OFFICE.

LUCIEN LINDEN, OF BRUSSELS, BELGIUM.

APPARATUS FOR PURIFYING LIQUIDS.

963,448.  Specification of Letters Patent.  Patented July 5, 1910.

Application filed March 16, 1909. Serial No. 483,677.

*To all whom it may concern:*

Be it known that I, LUCIEN LINDEN, a subject of the King of Belgium, residing at 117 Rue Belliard, Brussels, Belgium, have invented a new and useful Apparatus for Purifying Liquids; and I do hereby declare the following to be a full, clear, and exact description of the same.

The present invention relates to a new process for decanting, purifying, clarifying and aerating potable water with aid of an installation of special devices combined for sterilizing the water and at the same time eliminating iron from it together with lime, which has served as a germicide and as a precipitant, by carbonation. The same system may also be used for treating other liquids particularly waste waters or liquids containing solid materials in suspension. All kinds of reagents may be used.

The system may be described as follows:— River waters or the like are decanted, purified, sterilized, freed from iron and clarified economically in a preliminary vessel called hereinafter the decantation vessel. The lime is then eliminated by carbonating the water in one or more succeeding vessels hereinafter called the elimination vessels.

The accompanying drawings show by way of example different forms of apparatus for carrying out the foregoing system.

Figure 3:
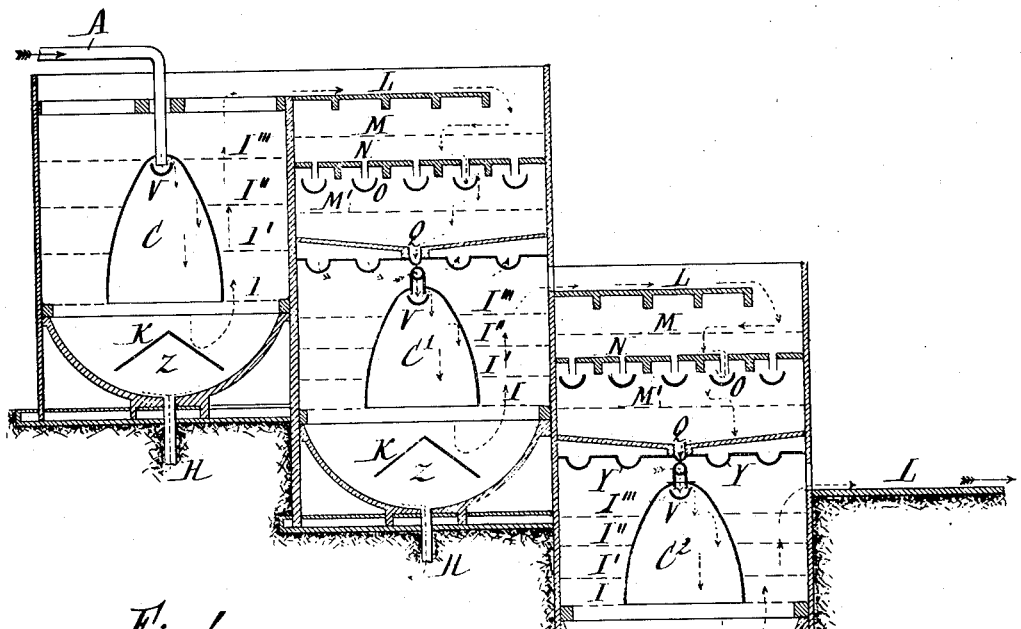
Figure 4:
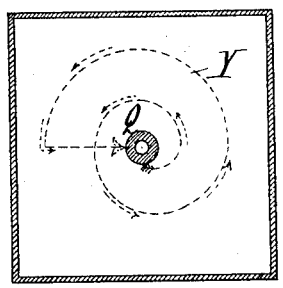

Figure 1 is a vertical section through a preferred form and Fig. 2 is a detail view of this apparatus. Fig. 3 is a vertical section through a modified form and Fig. 4 is a detail view of this modification.

The apparatus in which the reagent and the liquid to be purified are mixed in the aforesaid manner is shown on the left hand side of Fig. 1 at the top. The reagent is led through a pipe T into a mixer Y where it is made completely homogeneous by a stirrer S; it then flows into the water to be purified which is brought to the apparatus through pipe U, the last-named pipe and the pipe X, through which the reagent flows, being parallel and co-axial. The pipe X extends through the pipe U to within a certain distance of a plate W, set horizontally in an enlargement U' of the pipe U. As the water enters this enlargement it flows with violence against the plate W and there is produced a preliminary and very energetic intermixture. The pipe U discharges at a certain distance above a vat J contained within a tank and of such a form that the water and the reagent, being discharged with violence into the vat, are deflected into the tank and thoroughly intermixed. The mixture flows into the first vessel 1 at the top of a bell C through a pipe A, the length of which is at maximum 5 to 6 meters. It is within this pipe A that the agglomerate of the precipitant occurs. The liquid entering at the top of the bell C, hereinafter called the decantation bell, arrives in the decantation vessel 1.

The bell is of ovoid form, the larger diameter being at the top. The bell is open at its lower part where there are situated one or more gratings D of suitable material and of sufficiently large mesh not to retain the precipitate, their function being merely to diminish the turbulence and the eddies in the liquid so that these may not be propagated in the vessel 1 outside the bell; the gratings also control the amount of liquid passing through the bell. A second grating to damp the eddies in the liquid is shown at E. It is analogous to the gratings D and does not operate as a filter. It is placed at a certain distance below the bell C and beneath it is a series of oblique plates F diverging on one side and the other of a cone, pyramid or prism V, placed substantially co-axially with the bell C. These plates are for the purpose of preventing the sediment from rising up again and at the same time of spreading out the column of liquid as it leaves the bell so as to aid the uniform deposition of the precipitate. Beneath the plates F is another grating G of suitable material and analogous to those previously described, beneath which grating there is a space Z in which calm prevails; here the deposit is retained but is not disturbed. Other gratings I', I'', I''' of suitable material and large mesh are arranged, preferably horizontally, at equal distances apart so as to sub-divide the vessel into several zones in which the propagation of eddies cannot occur. It will be seen that vibrations and waves are arrested or more or less diminished in this vessel by the interposition of suitable gratings arranged so as to impede the propagation of the vibrations or waves.

At the same time since the circulation of the liquid and the impurities should be free, the grating should be of sufficiently large mesh not to offer any obstacle either to the circulation of the liquid or to the fall of the precipitated matter and should never act as filters.

At the top of the vessel 1 there is a table L; the liquid overflows from the vessel along this table and is exposed to the air on its way to the aerating apparatus M, N, O, P, M', Q. These apparatus are preferably situated at the upper part of a second vessel 2 called the elimination vessel; into this the water flows after it has been subjected to the action of the air and the carbon di-oxid which it contains. These aeration apparatus comprise alternating series of aerating tables L, P, distributing devices M, M', for breaking up the water into a fine rain, collectors N for combining the rain into large streams and finally a series of cups into which these streams are discharged. The water is at the same time submitted to the action of air so that the carbon dioxid transforms the lime into normal carbonate but not into acid carbonate. This arrangement has the characteristic that it determines a violent intermixture during the carbonation, thus provoking agglomeration of the carbonate of lime and rendering possible its rapid elimination. If the carbonation has not been effected the water will be milky and opalescent and sedimentation would be very difficult; by the present system the carbonate is granular and very heavy and deposits easily. The carbonating elements M, N, O, M' and P may be repeated as often as may be necessary. The carbonation precipitates and rapidly agglomerates the residual lime and other substances of which the hydrates or carbonates are insoluble. At the same time the water is very thoroughly aerated being intimately mixed with the air without having recourse to any mechanical spraying device, water-wheels, turbines or the like, which involve considerable cost and frequent repair, thus breaking the continuity of the process. The water collected in a final funnel Q flows into the summit of the bell C' called the elimination bell, through a suitably large pipe.

In the second vessel 2, which is in every respect analogous to vessel 1, the lime and the materials precipitated by the aeration and carbonation are removed. Its function is quite similar to that of vessel 1. The bell C', however, differs a little from that of vessel 1 in that the lower part extends right down to the inclined plates F'. It may be remarked however that either form of bell may be adopted indifferently whether for the decantation or the elimination.

When the water leaves the vessel 2 it may flow directly into the reservoir R or, if thought necessary, it may be caused to traverse a second aerating system identical with the first and a second eliminating basin and even a third, the number being limited only by the nature of the water under treatment and of the reagents used. Generally a single decantation vessel and a single elimination vessel will suffice but in certain cases the number of each kind of basin may be multiplied in order to obtain full efficiency. The vessels are preferably cylindrical in form with a hemispherical bottom; the walls are preferably flat and vertical.

The material of which the apparatus is constructed may be metal, brick, concrete—armored or not—wood, stone or the like.

The operation of the installation is as follows:—The crude water flows through the pipe U; it is intimately mixed therein with the agent arriving through pipe X; the two are violently intermixed in W and J and are finally conducted by the duct A, which is preferably open, to the air and within which the precipitation and agglomeration are rapidly effected as has been already stated. The water then flows into the bell C which is preferably at the center of the first vessel, the liquid stream is here subjected to sudden expansion and loss of velocity, the precipitate falls regularly to the bottom and guided by the plate F distributes itself uniformly in the space Z. The water which thus arrives slowly displaces an equivalent volume of water which has already been subjected to sedimentation and flows through the annular space between the plates F and the wall of the vessel, finally rising through the gratings G, E, I', I'', I'''. The water passes from the first into the second and succeeding vessels, if there be any, by way of the table L where it extends in a fine layer and whence it falls into the distributer M and through there in the form of a fine rain into the collectors N. The streams of liquid from N discharge themselves against the cups O and are reflected from this to fall upon the table P and thence on to the distributer M' and into the collector Q. The aeration and carbonation are effected during these series of descents. The lime thus precipitated and vigorously agglomerated is eliminated in the vessel 2 where the progress of the water is identical with that described for vessel 1. Finally the water after one or several aerations is discharged into a reservoir R to be distributed to the consumers.

The lime precipitated in the form of carbonate and duly agglomerated entrains any iron which may have been preliminarily transformed into hydrates by the action of the lime and then brought to a higher stage of oxidation by the aeration.

The modified apparatus shown in Fig. 3 does not differ essentially from the apparatus shown in Fig. 1, and to facilitate the description the elements common to the two apparatus are indicated by the same letters of reference. According to the example shown the apparatus comprises three vessels, but as has been already stated, it is obvious that the number may be varied as may be necessary. The apparatus comprises, like that in Fig. 1, decantation bells and elimination bells, C, C', C², gratings for damping eddies I, I', I'', I''', aerating tables L and aerating apparatus M, N, O, M', Q. The bells C, C', C² are of paraboloidal form, the summit being uppermost. The pipe for introducing liquid may be simply adjusted to the summit of the bell but it is preferable to make it extend into the bell as far as the focus of the paraboloid. A baffle $v$ may advantageously be fixed opposite the opening of the pipe. This baffle, which should be symmetrical, for instance a cup, plate or a cone or the like, breaks the jet and thus throws it against the walls of the bell. In practice the paraboloidal form may be limited to those parts which are directly struck by the jet of liquid, adopting a conical form for the rest of the bell. In consequence of the paraboloidal form there is obtained a jet which is strictly cylindrical in spite of the considerable expansion and the increase of velocity which the stream of liquid suffers; at the same time there is an increase in the intermixture of water.

Instead of the arrangement of plates and cones shown in Fig. 1 there may be used beneath the bells simple cones K, the dimensions of which are suitably chosen so that:—

(a) The vertical stream issuing from the bell may be reflected parallel to the walls of the bottom of the vessels. (b) The expansion of the stream of liquid may be regular and without jerks so that the sedimentation and precipitation may not be disturbed and the zone beneath the cone K may remain calm. The profile of the cone may be rectilinear or curvilinear providing the preceding conditions are fulfilled, notably that specified under (a).

For the purpose of enabling reagents to be mixed with the water before entering each bell and before the agglomeration of the precipitate, there may be arranged below the general collector Q a spiral duct Y, Fig. 4, which starting from the central pipe of the collector Q terminates in the pipe that feeds the bell below it. In the part of the central pipe of the collector Q which precedes the spiral it may be useful to place a stirrer permitting most energetic intermixture of the waters.

The same procedure may serve for treatment of mixtures of liquids which are not harmful and are of different densities for the purpose of separating them. It is also applicable to treatment of liquids with solids, for instance for separating ores of different densities suspended in water or in any other liquid.

It it to be understood that the form of the various parts of the apparatus and the mode of construction of the apparatus may be varied to suit the particular necessities of the case.

Having thus described the nature of my invention and the best means I know of carrying the same into practical effect, I claim:—

1. In apparatus for purifying liquids, the combination of a mixer, a stirrer within the said mixer, a pipe adapted to conduct the liquid to be treated, a pipe co-axial with and extending into the first named pipe and adapted to conduct liquid from the said mixer, an enlargement of the said pipe that conducts the liquid to be treated, a baffle plate in the said enlargement situated opposite the mouth of the said pipe conducting liquid from the mixer, a vat adapted to receive liquid falling from the said pipe conveying liquid to be treated, the said vat being adapted to intermix the liquids, a duct of length less than 6 meters adapted to convey liquid from the said vat and to promote agglomeration of solid matter in the said liquid.

2. In apparatus for purifying liquids, the combination of a series of vessels, a bell suspended in each vessel, means whereby the liquid to be purified is discharged into the summit of the said bell, horizontal gratings in the mouth of the said bell and in the vessel, the mesh of such gratings being sufficiently large not to retain sediment, diverging inclined plates situated in the said vessel below the said bell and a cone co-axial with the said bell and situated between the said diverging plates.

3. In apparatus for purifying liquids, a settling vessel, aerating devices above the said vessel, the said devices comprising aerating tables, collectors situated between the said tables and cups situated below the said collectors and adapted to receive streams of liquid therefrom.

4. In apparatus for purifying liquids, the combination of a vessel, a bell of paraboloidal form within the said vessel, a pipe adapted to deliver liquid into this bell, and a cone situated below the said bell and adapted to deflect the liquid flowing from the said bell in a direction parallel to the walls of the vessel.

5. In apparatus for purifying liquids, a vessel, aerating devices above the said vessel, a collector below the said aerating devices, a bell in the said vessel, a pipe at the center of the said collector and a channel of spiral form adapted to connect the said pipe with the summit of the said bell.

6. In apparatus for purifying liquids, a vessel, aerating devices above the said vessel, a collector below the said aerating devices, a bell in the said vessel, a pipe at the center of the said collector, a channel of spiral form adapted to connect the said pipe with the summit of the said bell, means for introducing a reagent in the said collector and a stirrer in the said pipe adapted to mix the said reagent with the liquid.

In testimony whereof, I have signed my name to this specification in the presence of two subscribing witnesses.

LUCIEN LINDEN.

Witnesses:
   DE BRANDNEZ,
   L. TAHNER.